April 21, 1959

H. EBERT 2,882,743

INFINITELY VARIABLE STEP-DOWN TRANSMISSION

Filed Jan. 18, 1957

INVENTOR
Heinrich Ebert

United States Patent Office 2,882,743
Patented Apr. 21, 1959

2,882,743

INFINITELY VARIABLE STEP-DOWN TRANSMISSION

Heinrich Ebert, Furth, Bavaria, Germany

Application January 18, 1957, Serial No. 635,070

Claims priority, application Germany January 21, 1956

4 Claims. (Cl. 74—472)

The present invention relates to transmissions and, more specifically, to an infinitely variable step-down transmission for use in connection with an accelerator controlled internal combustion engine. The transmission according to the present invention is particularly suitable for use in connection with motor vehicles driven by gasoline engines.

In connection with motor vehicles, it is known to control hydrostatic step-down transmissions by causing the accelerator when controlling the fuel supply to actuate a spring which has the tendency to counteract a centrifugal governor operated by the engine. With this known arrangement, the centrifugal governor acts together with the said spring upon a valve spool controlling the passage of oil under pressure which latter is adapted to actuate a hydraulic adjusting device for the hydrostatic step-down transmission. The hydraulic adjusting device consists of a cylinder with adjusting piston which latter is operatively connected to the hydrostatic step-down transmission through the intervention of an adjusting mechanism. With such an arrangement, any position of the accelerator, i.e. any throttle position, has coordinated therewith a certain motor speed. When the accelerator is adjusted for throttle wide open, the motor runs at its maximum speed of rotation. When the accelerator occupies its position corresponding to the throttle wide open, the condition of operation, i.e. the driving speed is immaterial.

However, only at higher driving speeds it is desirable that the motor runs at its maximum speed. At lower driving speeds, particularly in city traffic and when starting, it is felt disadvantageous, particularly in view of the loud motor noise, when the motor runs at its maximum speed.

It is, therefore, an object of the present invention to overcome the above mentioned drawbacks.

It is another object of this invention to provide an infinitely variable step-down transmission for use in connection with an accelerator-controlled internal combustion engine, which will bring about that the motor speed will be dependent not only from the position of the accelerator but also from the output speed of the engine, i.e. the driving speed of the vehicle.

It is still another object of this invention to provide an arrangement of the type set forth in the preceding paragraph, in which at low driving speed and with the accelerator in the position corresponding to the throttle wide open, the motor speed will be considerably lower than the maximum motor speed.

These and other objects and advantages of the invention will appear more clearly from the following specification in connection with the accompanying drawings, in which.

*General arrangement*

Figure 1:
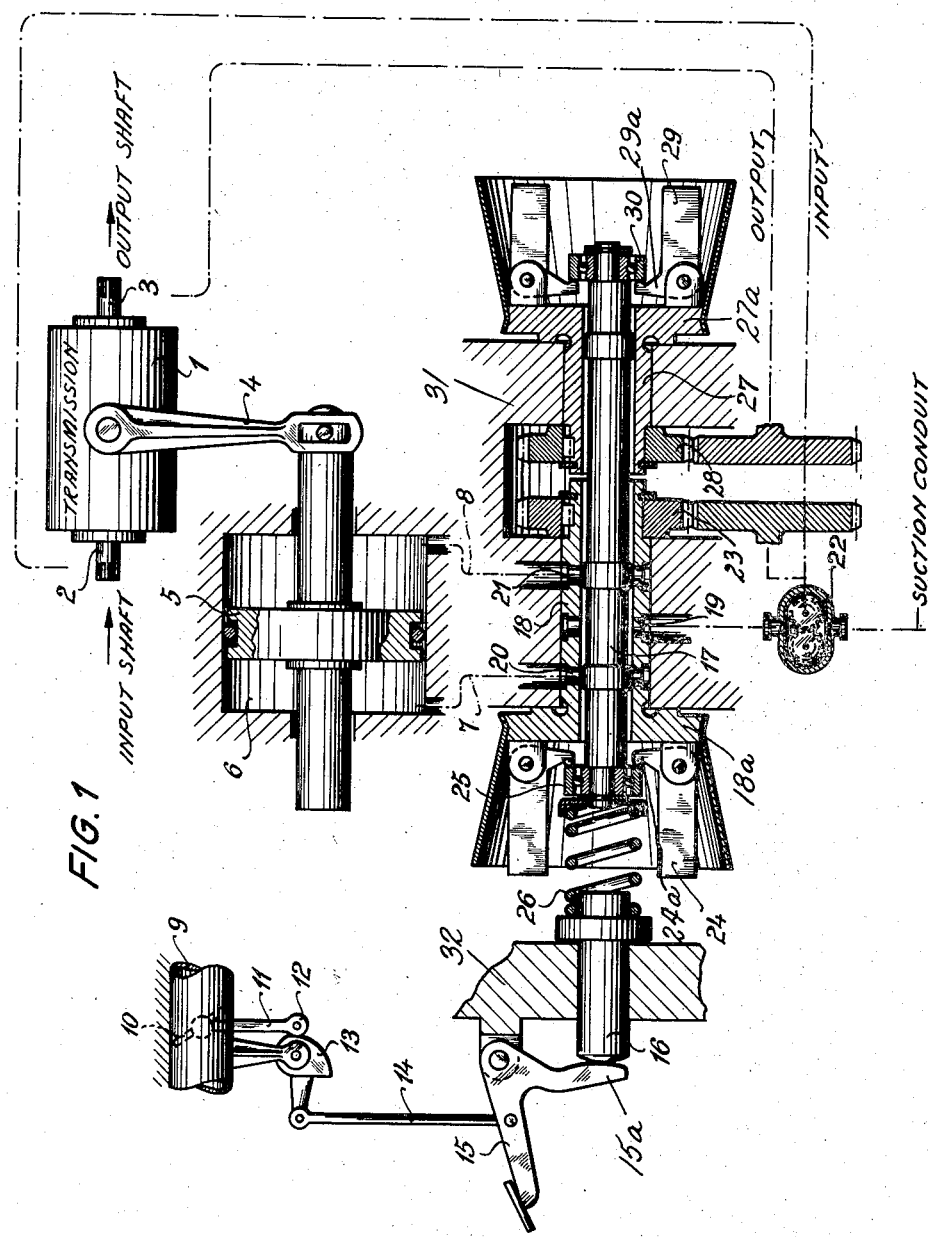
Fig. 1 is a diagrammatic illustration, partly in section, of an infinitely variable step-down transmission according to the invention in connection with an accelerator and gas throttle connected thereto.

The problem underlying the present invention has been solved according to the invention by providing an infinitely variable step-down transmission having a motor-driven centrifugal governor, with an additional centrifugal governor driven by the driven parts of the vehicle, and adapted to act upon a valve spool associated with the transmission, while said additional centrifugal governor has the tendency to act against the motor-driven centrifugal governor so that the motor speed will depend not only on the position of the accelerator but also on the output speed, i.e. the driving speed.

According to a further development of the invention, the fly-weights of the motor-driven centrifugal governor, the counter-acting spring, and the valve openings controlled by the valve spool are structurally adapted to the actuating mechanism for the accelerator and are so dimensioned that when the additional centrifugal governor is ineffective, i.e. at low driving speeds, the valve spool and therefore the adjusting mechanism with the step-down transmission are so adjusted that when the accelerator occupies its throttle wide open position, the motor speed is below the maximum motor speed. Accordingly, the fly-weights of said additional centrifugal governor are so dimensioned that at maximum driving speed, the valve spool and thus the adjusting mechanism with the step-down transmission are so adjusted that the motor rotates at its maximum speed.

The arrangement according to the invention may be so dimensioned that at low driving speeds as they appear substantially when driving in cities, the motor will even with the throttle wide open not exceed in strength a certain permissible sound.

*Structural arrangement*

Referring now to the drawings in detail, the reference numeral 1 designates an infinitely variable step-down transmission which may for instance be designed as a hydrostatic step-down transmission. The said transmission 1 is provided with an input shaft 2 for connection with the motor and with an output shaft 3. The transmission 1 comprises an adjusting lever 4 linked to an adjusting piston 5 which latter is reciprocably mounted in a cylinder 6 of the adjusting device. The cylinder 6 communicates with two conduits 7 and 8 respectively for conveying oil under pressure. As will be seen from the drawing, the conduit 7 is arranged on one side of the piston 5 while the conduit 8 is arranged on the other side of the piston 5.

The arrangement furthermore shows a portion of an intake manifold 9 having provided therein an adjustable gas throttle 10. The gas throttle 10 has connected thereto an actuating lever 11 with a roller 12 carried thereby. The roller 12 rests against a cam 13 adapted to be actuated by the accelerator 15 through the intervention of a link system 14. The accelerator 15 is tiltably journalled and designed in the form of a crank lever. As will be evident from the drawing, one arm 15a of the accelerator 15 is adapted to press against a guiding pin 16 which is slidably mounted in a chassis portion 32.

The control device for actuating the adjusting device for the transmission 1 consists primarily of the valve spool 17 longitudinally movable in the valve bushing 18. The valve spool 17 is provided with piston-like control portions for controlling an annular groove 19 for admitting oil under pressure and for controlling annular grooves 20 and 21 for the release of oil under pressure. Oil under pressure is delivered by a gear pump 22 through the annular grooves 20 and 21 into either conduit 7 or conduit 8 to one or the other side of the piston 5 depending on the position of the valve spool 17. The valve bushing 18 is journalled in a casing 31 so as to be rotatable about its longitudinal axis. The bushing 18 is driven by the engine through a gear 23 which may be driven either directly by the motor shaft or in a manner known per se through the intervention of gears. One end of the bushing 18 is provided with a flange 18a having pivotally connected thereto fly-weights 24. These fly-weights are tiltable in such a manner that the extensions 24a thereof due to the centrifugal forces acting upon the fly-weights 24 are adapted to press upon the outer race ring of a ball bearing 25 which latter has its inner race ring mounted on the valve spool 17. The valve spool 17 and the guiding pin 16 are in substantially axial alignment with each other so that axial movements of the pin 16 can be conveyed to the valve spool 17 through the intervention of a spring 26 interposed therebetween. As will be evident from the drawing, the spring 26 rests against the inner race ring of the ball bearing 25.

Adjacent the bushing 18 there is provided a bushing 27 which similar to the bushing 18 is rotatably mounted in the casing 31. The bushing 27 has keyed thereto a gear 28 adapted to be driven by the output shaft 3 of the transmission 1, shaft 3 either meshing directly with gear 28 or being drivingly connected thereto through the intervention of any standard gear transmission. The outer end of the bushing 27 is provided with a flange 27a having tiltably connected thereto fly-weights 29. The said fly-weights 29 are provided with extensions 29a which latter due to the centrifugal forces acting upon the fly-weights are adapted to press against the outer race ring of a ball bearing 30 which is mounted on the adjacent end of the valve spool 17. The fly-weights 24 and 29 are adapted due to the centrifugal forces acting thereupon to act upon the valve spool 17 in a mutually opposite direction.

According to the specific arrangement shown in the drawing, the accelerator 15 when actuated brings about an adjustment of both the throttle 10 and the transmission 1. The adjustment of the transmission in addition to depending on the actuation of the accelerator 15 also depends on the speed of the output shaft 3 which latter is conveyed to the control device through the gear 28.

Figure 2:
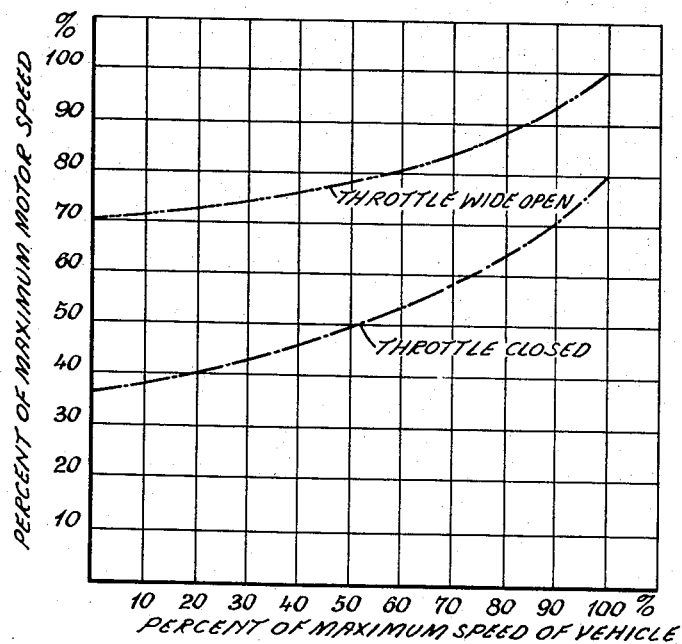
Fig. 2 illustrates by way of a graph the dependency of the motor speed from the output speed of the engine.

The control spring 26 is so adjusted and dimensioned that the motor speed, for instance at very low driving speed of the vehicle or at a standstill thereof, will with the throttle wide open be below the maximum motor speed indicated at 100% in Fig. 2. With increasing output speed, i.e. driving speed, the effect of the fly-weights 29 increases with the second power of the driving speed. Therefore, in order to maintain equilibrium of the valve spool, the fly-weights 24 must rotate faster to the same extent whereby a certain driving speed characteristic is obtained illustrated in Fig. 2 for throttle wide open and a certain partial load in relationship to the driving speed.

Contrary to the heretofore possible and known controls, with the arrangement of the invention the maximum motor speed is obtained only at the maximum driving speed even if the accelerator occupies its position for throttle wide open. At lower driving speed, the motor rotates at lower speeds and, in conformity with the invention, even when the accelerator occupies its position for throttle wide open.

The mutual adaptation of the individual control elements can in each instance be obtained by correspondingly dimensioning the fly-weights near each end of the valve spool as well as by appropriate step-down of the speeds of the fly-weights. The sensitivity of the fly-weights driven by the motor will hereby not be disturbed in any way.

It is to be understood that the invention is applicable by mechanical as well as by hydraulic step-down transmissions.

It is also to be understood that the present invention is, by no means, limited to the particular arrangement shown in the drawings but also comprises any modifications within the scope of the appended claims.

What I claim is:

1. In combination with an infinitely variable transmission having an input shaft and an output shaft and fluid operable adjusting means for adjusting said transmission: a valve casing, a first bushing rotatably mounted in said casing and drivingly connected to said input shaft, said bushing being provided with first passage means for connection with a fluid source and also with second passage means for connection with said adjusting means, a valve spool reciprocably mounted in said first bushing, a throttle movable selectively from a slight open position to a wide open position and vice versa, a lever, a link system linked to said lever and operable thereby for controlling the position of said throttle, spring means interposed between said lever and said valve spool, first fly weights linked to said first bushing and operable in response to centrifugal forces acting thereupon to act upon said valve spool against the thrust of said spring means, a second bushing rotatably mounted in said casing and drivingly connected to said output shaft, and second fly weights linked to said second bushing and operable in response to centrifugal forces acting thereupon to act upon said valve spool in the direction of the thrust of said spring means.

2. In combination with an infinitely variable transmission having an input shaft and an output shaft and fluid operable adjusting means for adjusting said transmission: a valve casing; a first bushing rotatably mounted in said casing and drivingly connected to said input shaft; said bushing being provided with first passage means for connection with a fluid source and also with second passage means for connection with said adjusting means; a valve spool reciprocably mounted in said first bushing, a throttle movable selectively from a slight open to a wide open position and vice versa; a lever; a link system linked to said lever and operable thereby for controlling the position of said throttle; spring means interposed between said lever and said valve spool; first fly weights linked to said first bushing and operable in response to centrifugal forces acting thereupon to act upon said valve spool against the thrust of said spring means; a second bushing rotatably mounted in said casing and drivingly connected to said output shaft; and second fly weights linked to said second bushing and operable in response to centrifugal forces acting thereupon to act upon said valve spool in the direction of the thrust of said spring means; said first fly weights, said spring means, and said valve spool being so dimensioned that at a standstill and at low speed of said output shaft with said lever in position corresponding to the wide open throttle position the speed of said input shaft will be below its maximum speed.

3. In combination with an infinitely variable transmission having an input shaft and an output shaft and fluid operable adjusting means for adjusting said transmission: a valve casing; a first bushing rotatably mounted in said casing and drivingly connected to said input shaft; said bushing being provided with first passage means for connection with a fluid source and also with second passage means for connection with said adjusting means; a valve spool reciprocably mounted in said first bushing; a throttle movable selectively from a slight open position to a wide open position and vice versa; a lever; a link system linked to said lever and operable thereby for controlling the position of said throttle; spring means interposed between said lever and said valve spool; first fly weights linked to said first bushing and operable in response to centrifugal forces acting thereupon to act upon said valve spool against the thrust of said spring means; a second bushing rotatably mounted in said casing and drivingly connected to said output shaft; and second fly weights linked to said second bushing and operable in response to centrifugal forces acting thereupon to act upon said valve spool in the direction of the thrust of said spring means;

said second fly weights being so dimensioned that at maximum speed of said output shaft the valve spool is adjusted for causing said adjusting means to adjust said transmission so that the input shaft will rotate at maximum speed.

4. In combination with an infinitely variable transmission having an input shaft and an output shaft and a fluid operable adjusting device for said transmission, a valve for controlling the flow of fluid to and from said adjusting device, said valve comprising in combination: a valve casing provided with first fluid conduit means for communication with a fluid source and with second fluid conduit means for communication with said adjusting device, a first bushing rotatably connected to said input shaft and provided with passages for communication with said fluid conduit means, a second bushing drivingly connected with said output shaft, a valve spool reciprocable in said first bushing for controlling said passage means, first centrifugal fly weight means linked to said first bushing near one end of said valve spool, second centrifugal fly weight means linked to said second bushing near the other end of said valve spool, said first and second fly weight means being arranged in response to centrifugal forces acting thereupon to act upon said valve spool in opposite direction, actuating means, and spring means interposed between said actuating means and that end of said valve spool which is adjacent said first fly weight means, said spring means continuously urging said valve spool in a direction counter to the direction of adjustment of said valve spool by said first fly weight means, said actuating means being operable to vary the thrust of said spring means.

References Cited in the file of this patent

UNITED STATES PATENTS

| | | |
|---|---|---|
| 2,352,212 | Lang et al. | June 27, 1944 |
| 2,498,600 | Brunken | Feb. 21, 1950 |
| 2,588,140 | McFarland | Mar. 4, 1952 |
| 2,765,893 | Stuart | Oct. 9, 1956 |